E. MAGERLE AND H. MARTINEK.
DEVICE OR ARRANGEMENT FOR THE CONTINUOUS MOVEMENT OF ROLLING OR SLIDING BODIES.
APPLICATION FILED JUNE 10, 1914.
1,393,231. Patented Oct. 11, 1921.
2 SHEETS—SHEET 1.
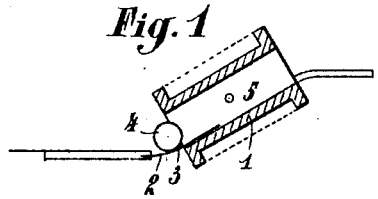
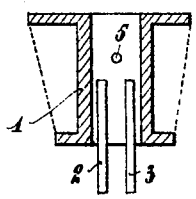
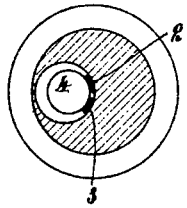
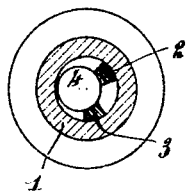
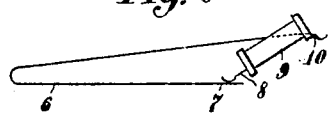
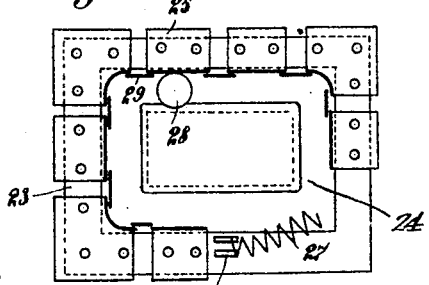
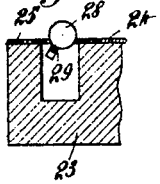
Inventors
Edmund Magerle & Hermann Martinek
by O. Singer Attorney
Witnesses

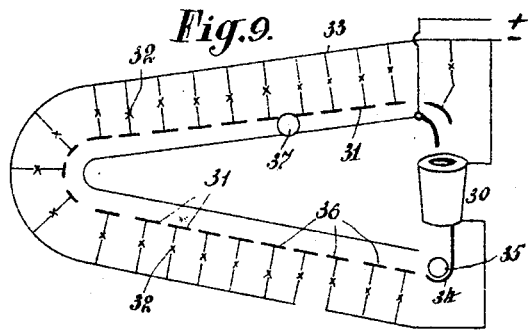
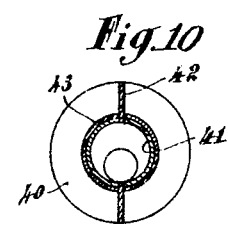
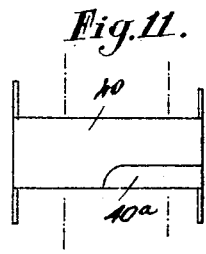
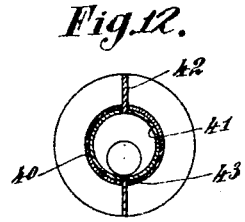
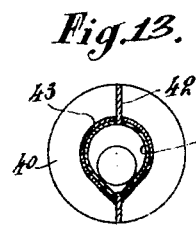
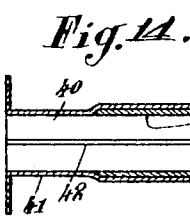
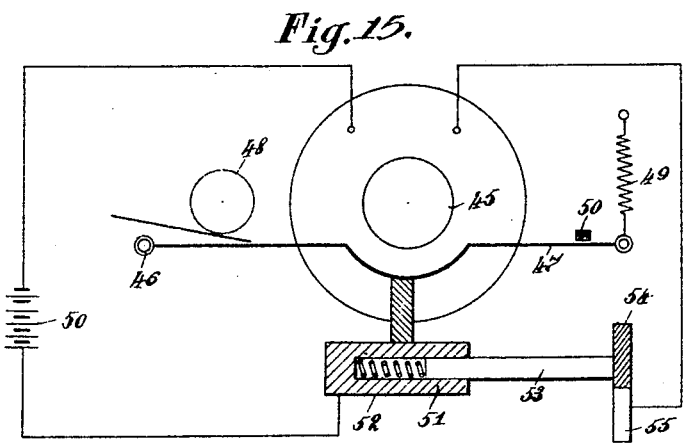

UNITED STATES PATENT OFFICE.

EDMUND MAGERLE AND HERMANN MARTINEK, OF VIENNA, AUSTRIA, ASSIGNORS OF ONE-THIRD TO ADOLF VOGLMAYER, OF VIENNA, AUSTRIA.

DEVICE OR ARRANGEMENT FOR THE CONTINUOUS MOVEMENT OF ROLLING OR SLIDING BODIES.

1,393,231.  Specification of Letters Patent.  Patented Oct. 11, 1921.

Application filed June 10, 1914. Serial No. 844,260.

(GRANTED UNDER THE PROVISIONS OF THE ACT OF MARCH 3, 1921, 41 STAT. L., 1313.)

*To all whom it may concern:*

Be it known that we, EDMUND MAGERLE, resident at Vienna, XIII, Hietzingerhauptstrasse 47, and HERMANN MARTINEK, resident at Vienna, V, Margarethengürtel 120, both subjects of the Emperor of Austria, have invented certain new and useful Improvements in a Device or Arrangement for the Continuous Movement of Rolling or Sliding Bodies.

The subject of the invention is an arrangement for constantly maintaining in motion a freely and automatically rolling body as for example a ball or roller so that the movement of the same in a closed path or to and fro in a path determined at both ends continues uninterruptedly and unaffected by resistances. The present invention can be utilized in many ways and is intended in the first place to close and open a number of contacts of sources of light in succession, especially for advertising purposes, by the rolling of a ball or roller which, when its movement is brought to rest by frictional resistance or by reason of the particular arrangement of the device, receives an impulse which enables it to start its movement again.

The principle underlying the invention consists in the arrangement of a coil at one end of which are arranged side by side two contact strips which when connected switch the winding of the coil into a current circuit. When therefore the member for closing the current circuit reaches these two contacts the coil becomes excited and endeavors to draw the body toward its center. Hereby the body is subjected to an acceleration. Now the contacts are so arranged that the excitation of the coil becomes interrupted before the rolling body reaches the electrical center of the coil so that, owing to the acceleration it has received, it moves farther in order to continue its journey.

In the accompanying drawings:

Figure 1 shows a preferred form of the device according to the present invention.

Fig. 2 is a detail view of a coil with two contact strips.

Fig. 3 is a vertical section through a coil provided with conical windings.

Fig. 4 is a horizontal section through a coil showing the eccentric bore.

Fig. 5 is a similar view in which the ball is disposed to one side of the longitudinal axis of the coil and held against the contacts.

Fig. 6 shows an inclined pathway for the ball.

Fig. 7 shows diagrammatically a device for closing successively a series of contacts.

Fig. 8 is a cross-section through the device Fig. 7.

Fig. 9 shows a modified form of the device in which at least two rolling bodies are provided.

Fig. 10 shows a core made in two parts and constituting contact pieces for switching the coil into circuit.

Fig. 11 shows a coil in two parts having a portion cut away.

Fig. 12 shows a core similar to Fig. 10 surrounded by a layer of insulating material.

Fig. 13 shows a modified form of core Fig. 10 with the rolling body moving in a kind of channel.

Fig. 14 shows a coil having a reduced diameter throughout a portion of its length.

Fig. 15 shows diagrammatically a device in which the rolling body itself switches the coil into circuit without being itself included in the same.

The device based on the principle is illustrated in Figs. 1 and 2 in longitudinal section and in front view respectively. As may be seen from these figures, the device comprises a coil 1 provided at one end with two contact strips 2 and 3 (Fig. 2) by connecting which by means of the rolling body (ball) 4 the coil is excited. When the ball, which is of conducting material, arrives at the contacts the current flowing through the coil creates a field which tends to draw the ball to the electrical center 5. Hereby the ball is subjected to an acceleration due to the current flowing through the coil. Assuming now that the contacts 2, 3 are of such a length that the current circuit of the coil is broken before the ball arrives at the electrical center then the ball will continue in its movement due to the acceleration which can then be directly utilized or may serve to bring the ball to a higher level from which it automatically continues its journey along an inclined path.

The coil itself can be constructed in many different ways. It may be provided with a conical winding (Fig. 3) so that the electrical center 5 becomes displaced toward one end and located beyond the central point lengthwise of the coil. The result is that the period of acceleration is extended over a path which is nearer than the path which the ball has to traverse before it leaves the coil.

In order to insure that the ball during its accelerated movement remains in touch with the contacts the bore of the bobbin can be arranged eccentric to the coil (Fig. 4) in which case the contacts can be set into the thicker substance of the bobbin and even arranged so as to be but slightly prominent. The contacts however may also be set in a bobbin with a central bore so that the ball, the diameter of which almost corresponds to that of the bore, becomes located, owing to the contacts, to one side of the longitudinal axis and is held against the contacts by its endeavors to regain the axial position.

This device by imparting accelerating movements can be utilized in many different ways. The present invention is primarily intended as stated for the closing and opening in turn by the movement of a ball of contacts of sources of light, as for example to light up and extinguish advertisements. Thus for example an inclined pathway (Fig. 6) may be provided upon which the ball rolls downward by its own weight. The several contacts themselves are located in the pathway and are closed one after the other by the movement of the ball. When the ball reaches the lowest point 7 it closes the contacts 8 of the coil 9 by means of which the ball is subjected to an acceleration and is thereby raised once more to the highest point 10. When the path is long several coils may be employed and the ball may be raised stepwise from one stage to another by means of a single coil, the ball being raised from one coil to the contacts of the next following coil. If required, a plurality of coils may be distributed over the whole path so that the ball in running down an inclined path arrives at a coil by which it is raised and thence rolls on along another inclined path. Such an arrangement can be extended over the whole path of movement of the ball. The path itself however can also be horizontal and the acceleration to be imparted to the ball by the coil can be so proportioned that the ball will run along the horizontal path a predetermined distance closing the contacts until finally before the momentum imparted to it has been spent it receives a fresh impulse.

In Figs. 7 and 8 is shown diagrammatically a device for the closing of a series of contacts one after another. The device comprises a foundation plate upon which on the one hand a single plate 24 in circuit with all the sources of light is arranged whereas on the other hand the separate contacts 25 of the individual sources of light are constituted by plates held by screws. At the end of the continuously descending pathway are provided the contacts 26 of the solenoid 27. The distance between the contact plates is so proportioned that the center of gravity of the ball lies but little higher than the upper surface of the contact plates so that the ball rolls slowly. In order to prevent the ball falling through when the pathway for the ball 28 becomes too wide, owing to the eating away of the contact plates at the bridging points, due to sparking when the circuit is broken, supports 29 for the balls are provided below the balls at the bridging points, so that even when eating away takes place it will be impossible for the ball to fall through since this is prevented by said supports which are advantageously made of insulating material.

Now according to a modified form of the invention at least two rolling bodies are provided of which one shall be at rest at one end of the coil in such a position as to receive an impulse to movement upon the coil becoming excited. This arrangement is illustrated diagrammatically in Fig. 9. The track which is for example inclined comprises a coil 30 connected with one terminal and lower contacts 31, which are connected through sources of light 32, with a conductor 33 connected with the other terminal of the source of current. The coil 30 is seen at the lowest point of the track. Below the coil is located a seat 34 for the rolling body 35, which seat is however electrically non-conducting, that is to say, the rolling body does not connect same in the circuit of the coil. Near the seat 34 at the end of the track are one or more contacts 36, which are so connected with the winding on the coil 30 that when the circuit is closed through these contacts the coil 30 is energized. When therefore a second rolling body 37 arrives at these contacts the coil 30 becomes energized and the rolling body 35 resting on the seat 34 receives from the coil 30 an acceleration and effects upon its consequent movement the switching into circuit of the source of light, while said second rolling body 37 after having finished its movement comes to rest upon the seat 34. It is advantageous to provide several contacts 36 so that in case one of them refuses to act, the excitation of the coil can be effected by the others.

Such a refusal to act can be traced back to various causes. The cause which most frequently arises lies herein that in consequence of the difference in speed with which the body rolls over the contacts, the duration of the excitation of the coil is insufficient for the conveyance of the body from the seat 34 to the highest point of the track. In order to avoid this disadvantage, the length of each contact 36 in succession is increased so that in case the circuit is not held closed for the necessary period at the first contact, owing to the speed of the rolling body being too great, it will be effected by the second or third longer contact. It is true that the coil will be excited through the first contact, nevertheless, owing to the excitation of the coil being too short, the body which happens to be on the seat will not receive sufficient impulse and will fall back upon the seat. When therefore the circuit of the coil is also held closed for a longer time through the second longer contact the impulse may then be sufficiently prolonged to effect the desired object. Should this however not be the case then the last contact finally comes into operation. If the effect is obtained at the first contact then the following contacts are closed without interfering with the effect produced. Obviously in such a case the contacts must be at such a distance apart that the body receiving the impulse can fall back upon the seat 34 again, while the rolling body 37 moves from one contact to another.

Further subject-matter of the invention relates to the formation of the core. Instead of constructing same as hitherto out of insulating material and in one piece, it is formed of two parts 40 and 41 constructed of conducting material constituting contact pieces for switching the coil into circuit separated by an intermediate layer 42 (Figs. 10–12). The body passing through this coil connects the two parts and effects the excitation of the coil. Now in order to limit the duration of the excitation so that the coil is switched out of circuit before the body reaches the electrical center one of the two parts of the coil is cut away for a portion of its length as shown at 40ª, Fig. 11 in order that the circuit may be broken at the proper moment. In order to give the coil the full form of the winding the core is surrounded by a layer 43 of insulating material. The cross-section of the bore of the coil at the place on which the rolling body moves can advantageously be made to form a kind of channel (Fig. 13).

With the same object the diameter of the coil may also be reduced throughout a portion of its length (Fig. 14) in which case, in order to obtain a bore of like diameter throughout the whole length, a piece 44 of insulating material is then inserted in the wider part.

Finally Fig. 15 shows an arrangement, exemplified diagrammatically, whereby the rolling or sliding body itself effects the switching into circuit of the coil imparting the acceleration, without being itself included in the circuit. This is attained by arranging in front of the coil 45 for example a lever 47 capable of pivoting about a point 46, or other like movable member, which is formed as a bowl for the reception of the moving body 48 in front of the opening through the coil. A spring 49 holds the member in its highest position which is determined by a stop 50. In the constructional form shown, on the lever 47 is provided an insulated sleeve 51 in which one contact piece 53 is pressed forward by a spring 52 against a contact piece. The contact piece is constituted by two parts 54, 55, of which the one 54 consists of insulating material, while the other part 55 is formed of conducting material and constitutes the second contact piece. When the two contact pieces 53. 55 touch. the circuit of a source of current 50 is closed, in which circuit the winding of the coil is also included. The strength of the spring 49 is so determined as to hold the member 47 in the highest position. whereas the member, when loaded by the body 48, falls against the pull of the spring 49, so that the contacts 53 and 55 come into touch. Obviously in place of the contacts shown, other contacts may be employed, a mercury contact for example.

When the moving body arrives upon the lever 47, the lever falls owing to the load and the contacts 53, 55 close the circuit of the source of current 50, so that the coil becomes excited. The coil 45 therefore endeavors to draw the body 48 to the electrical center of the coil thereby imparting to the body the necessary acceleration. Hereby however the load is removed from the lever 47 so that the spring 49 raises it and the current circuit is broken.

The contact 53 being guided in a sleeve and pressed by a spring against the parts 54, 55 a proper contact is thereby insured and the consequences of wear obviated.

We claim:

A device of the character described comprising in combination, a coil, contacts at one end of said coil, a rolling body adapted to connect said contacts, and to close a circuit for exciting the coil, said coil tending to draw said body toward its center, and said contacts forming the pathway for the rolling body and being arranged at such a distance apart that the center of the rolling body is located but slightly above the upper surfaces of the contacts for effecting a rolling of said body at a low rate of speed only, substantially as described.

Signed at Vienna this 5th day of May 1914.

EDMUND MAGERLE.
HERMANN MARTINEK.

Witnesses:
 RUDOLF ZIPSER,
 AUGUST FUGGER.